Fig.1

June 17, 1947.                    W. HOIER                    2,422,414
                          INDEX MILLING MACHINE
                    Filed April 19, 1943        10 Sheets-Sheet 6

INVENTOR.
Walter Hoier
BY  Leigh W. Wright.
ATTORNEY

June 17, 1947.  W. HOIER  2,422,414
INDEX MILLING MACHINE
Filed April 19, 1943   10 Sheets-Sheet 7

INVENTOR.
Walter Hoier
BY Leigh W. Wright.
ATTORNEY

June 17, 1947.  W. HOIER  2,422,414
INDEX MILLING MACHINE
Filed April 19, 1943  10 Sheets-Sheet 10

Fig.15  Fig.16

INVENTOR.
Walter Hoier
BY Leigh W. Wright.
ATTORNEY

Patented June 17, 1947

2,422,414

UNITED STATES PATENT OFFICE 2,422,414

INDEX MILLING MACHINE

Walter Hoier, Cincinnati, Ohio, assignor to The Cincinnati Milling Machine Co., Cincinnati, Ohio, a corporation of Ohio Application April 19, 1943, Serial No. 483,686

8 Claims. (Cl. 90—21.5)

This invention relates to milling machines and more particularly to an improved automatic radial milling machine.

One of the objects of this invention is to provide an improved milling machine for milling a series of radial surfaces on a work piece in automatic succession.

Another object of this invention is to provide a new and improved mechanism for effecting an automatic radial milling cycle comprising repetitive reciprocations between work and tool with indexing movements interposed between the reciprocations and stop means effective after a complete rotation of the work to terminate the cycle and permit work reloading.

A further object of this invention is to provide a self-contained indexing fixture for the purposes intended which may be angularly adjusted and/or longitudinally positionable upon the work supporting platen of a machine with facility.

Another object of this invention is to provide an improved hydraulically indexible feature which is adaptable for use on an hydraulically operated machine whereby the same source of pressure may be utilized for power producing purposes.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts.

Figure 1:
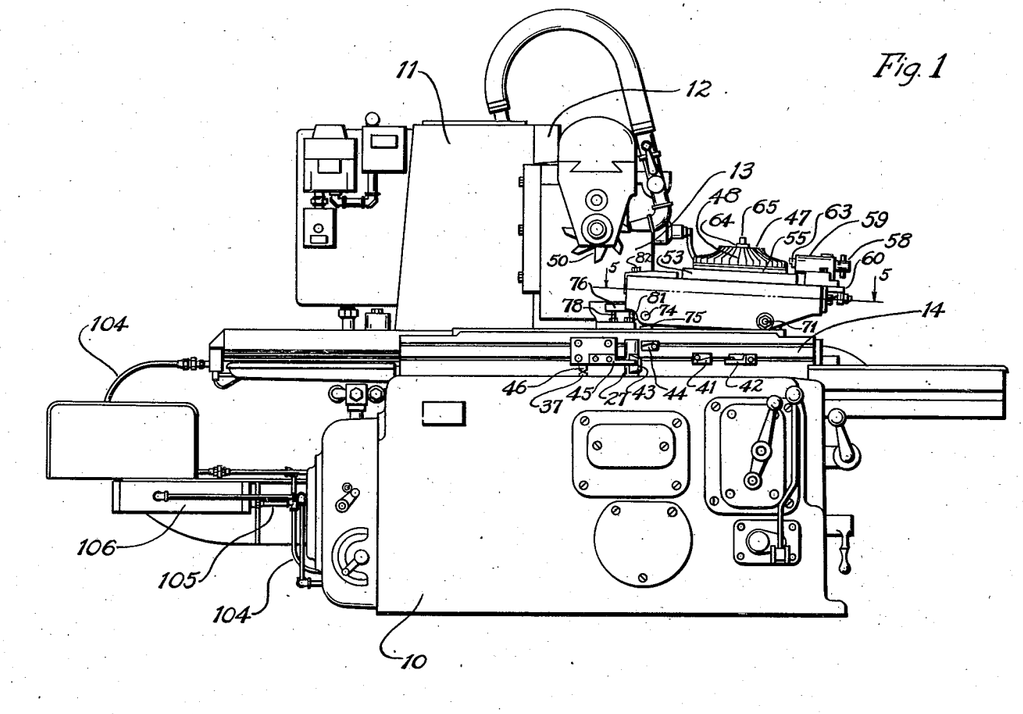
Figure 1 is a front elevation of a machine tool embodying the principles of this invention.

Referring to Figure 1 of the drawings the reference numeral 10 indicates the bed of the machine from the rear of which uprises a column 11 having vertical guideways 12 formed thereon for receiving and guiding a vertically adjustable spindle carrier 13. The bed supports a reciprocating table 14 which is adapted to be actuated by a piston 15, Figure 14, contained in a cylinder 16, the cylinder being formed integral with the bed and the piston being connected by a piston rod 17 to one end of the table 14. The hydraulic drive mechanism for controlling reciprocation of the table may be the same as that shown in United States Letters Patent 2,019,486, issued November 5, 1935, and since it forms no part of the present invention it will not be described in detail herein.

Figure 14:
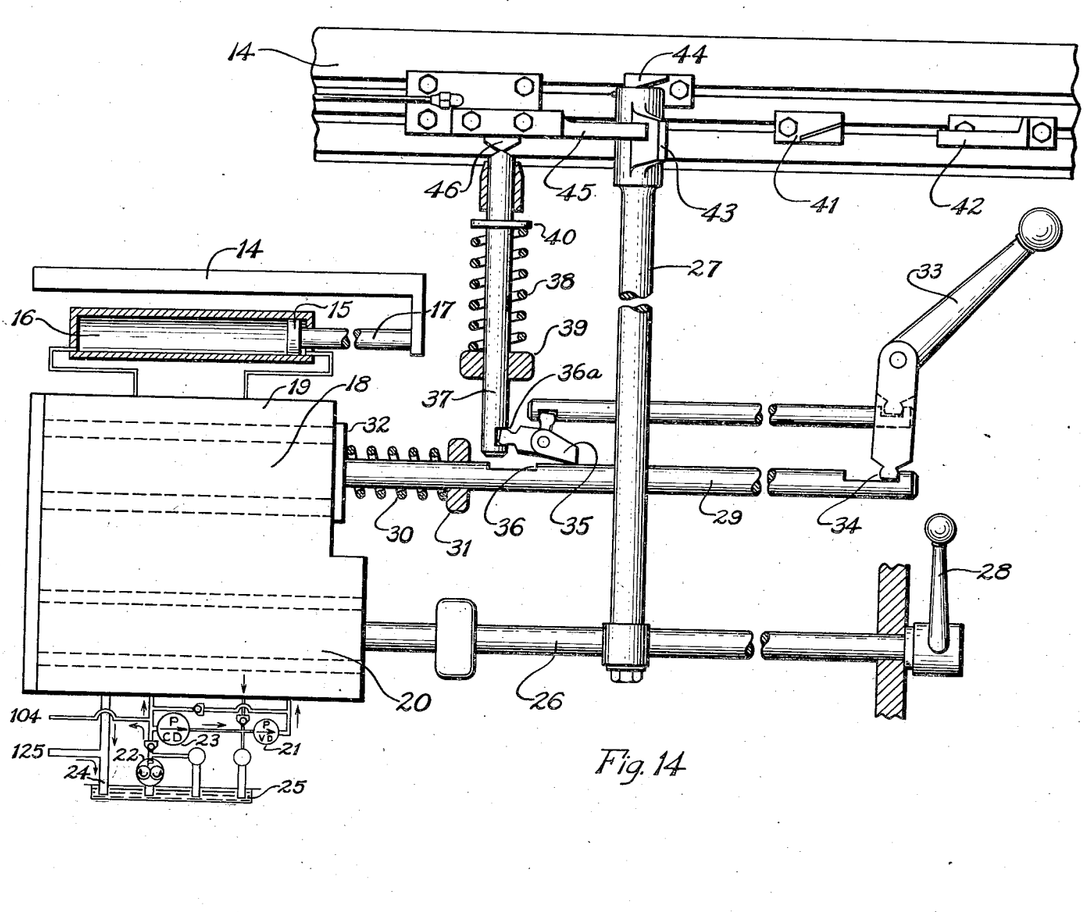
Figure 14 is a schematic view of the table control mechanism.

Briefly, it comprises a stop valve 18 reciprocably mounted in a housing 19, and a selector valve 20 mounted in the same housing, and fluid pressure is supplied by a feed pump 21, and a rapid traverse pump 22, both of which are connected to the selector valve. A booster pump 23 serves to maintain the feed pump supply lines under a predetermined pressure by supplying makeup oil thereto as required. A return line 24 extends from the selector valve to a reservoir 25 and acts as a return when the rapid traverse pump is utilized.

The selector valve plunger may be reciprocated by a rod 26 to provide two stations and the plunger may also be partially rotated which provides a combination of four positions for the selector valve plunger. Assuming the selector valve plunger to be rotated into one plane, it will provide rapid traverse right and feed left for its two axial positions and when oscillated into a second plane it will provide feed right and rapid traverse left for its two axial positions in that plane. Thus, the selector valve controls the rate and direction of table movement while the stop valve interposed in series with it controls the starting and stopping of the table.

A trip control plunger 27 is operatively connected to the shaft 26 for control of automatic positioning of the selector valve and is supported for rotation and oscillation in the bed of the machine. Movement of the plunger up or down will change the rate for a given direction as from rapid traverse to feed, or feed to rapid traverse. When the plunger is rotated it will not only effect a change in direction in table movement, but also a change in rate. The shaft 26 may also be rotated and axially shifted by a manual control lever 28 mounted on the end of the bed and operatively connected to the shaft 26 for universal movement to effect these movements.

Since it will be noted that the selector valve does not have a stop position, it is necessary to provide the stop valve 18 which has two positions, in one of which the table will be stopped and the other in which the cylinder 16 will be operatively connected to the selector valve. The stop valve plunger may be shifted by a shifter rod 29 which is normally held in a stop position by a spring 30 which is interposed between a fixed abutment 31 of the machine and a shoulder 32 carried by the valve. The rod 29 may be shifted to the right by a control lever 33 which has a lost motion connection 34 with the rod 29 whereby rotation of the lever in a counterclockwise direction will shift the rod 29 against the resistance of spring 30.

This movement is continued until a pawl 35 drops into a notch 36 in the rod 29 thereby holding the valve in a running position. The latch 35 is operatively connected at 36a to a stop plunger 37 which is normally urged upward by a spring 38 interposed between a fixed abutment 39 and a collar 40 carried by the plunger 37. From this it should be obvious that if the plunger 37 is depressed, the pawl 35 will be withdrawn from the notch 36 and the spring 30 will shift the stop valve 18 to a stop position. It may be replaced in a running position by the manual control 33, which is thus utilized as a starting lever for the machine.

In this machine the cycle of reciprocation of the table contemplates that the table 14 will move to the left as viewed in Figure 1 from a starting or work loading position and proceed at a rapid traverse rate until the work has reached the cutter at which time a trip dog 41 attached to the front of the table will raise the plunger 27 and thereby move the selector valve into a feed position. The table will proceed at a feed rate until a reversing dog 42, also mounted on the table, engages the wing 43 of the trip plunger 27 and rotates it in a clockwise direction as viewed in plan. This will change the direction of movement as well as the rate, and the table will return to the right at a rapid traverse rate. Just before the table reaches its return position a third trip dog 44 carried by the table will depress the plunger 27, thereby changing the rate from rapid traverse to feed and immediately thereafter a second reversing dog 45 will engage the wing 43 and rotate the shaft 27 in a counterclockwise direction as viewed in plan, whereby the table will reverse and advance again at a rapid traverse rate. This cycle of operation will repeat for a predetermined number of times as will be explained more fully hereafter and then a stop dog 46 which has been rendered ineffective throughout these various sub-cycles will become effective and depress the stop plunger 37 whereupon stop valve 18 will be shifted to a stop position whereby one full automatic cycle of the machine will be completed.

Figure 2:
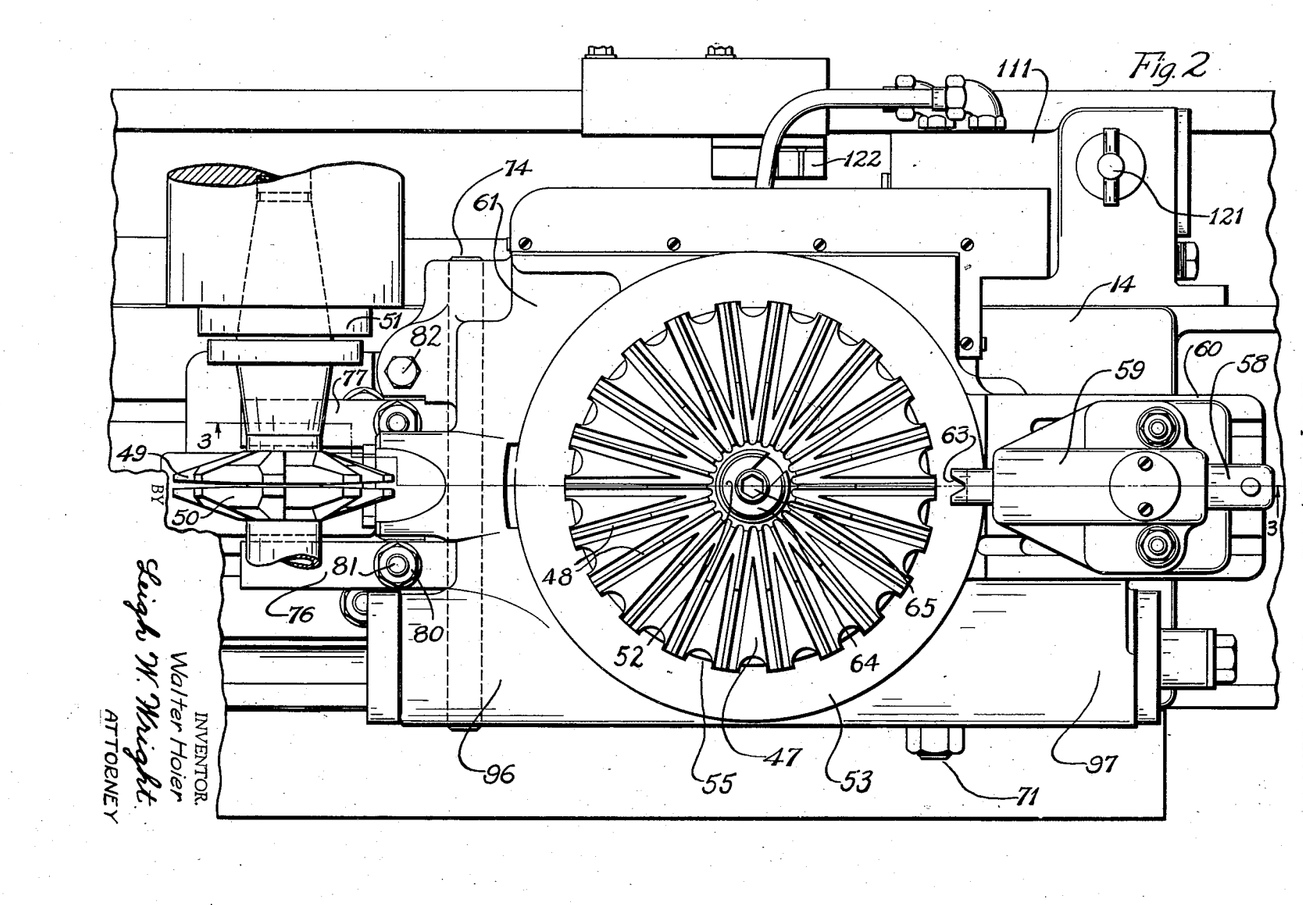
Figure 2 is a plan view of the indexable work support.
Figure 4:
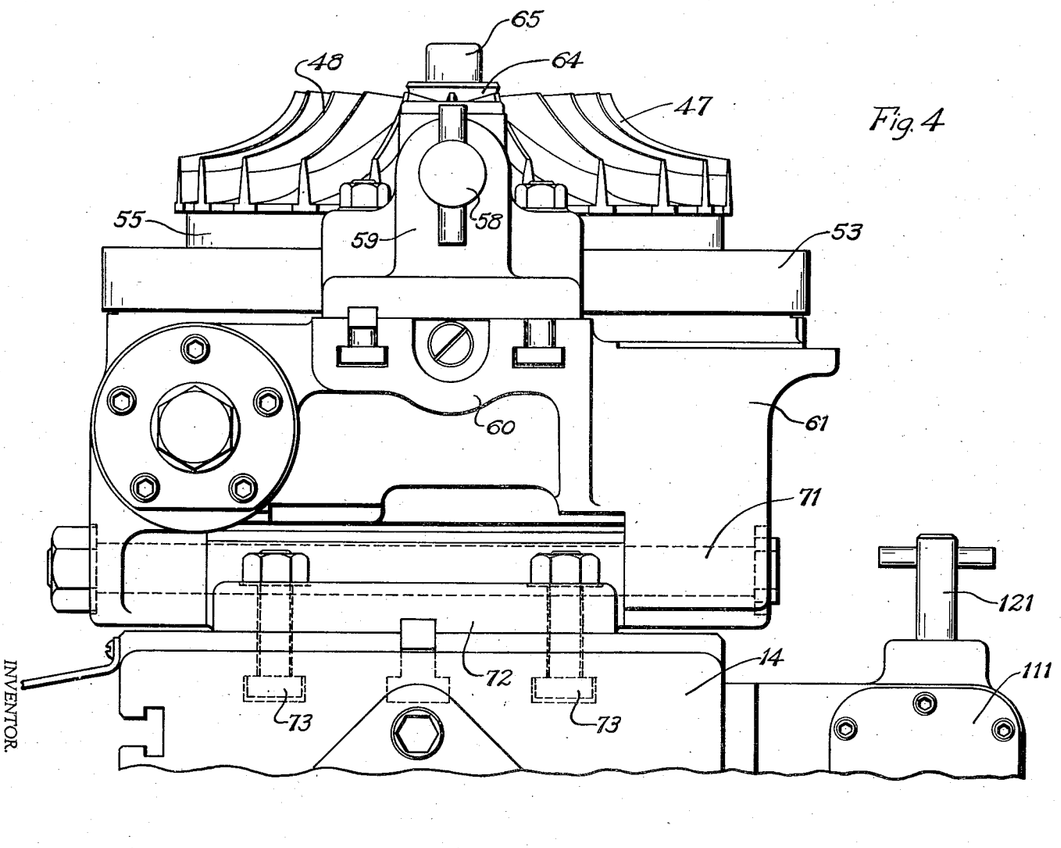
Figure 4 is an end view of the work supporting fixture as viewed from the right hand end of Figure 1.

Referring to Figures 2 and 4 the reference numeral 47 indicates an example of a work piece that is adapted to be milled on this machine. It will be noted that this work piece has a plurality of radially extending vanes 48 and it is required that the opposite sides of these vanes be milled or machined. A pair of cutters 49 and 50 are supported by an arbor 51 journaled in the carrier 13 and these cutters are spaced on opposite sides of a radial line passing through the center 52 of the rotary work table 53. These cutters are so ground as to mill the opposite sides of the blades at a slight angle.

Figure 3:
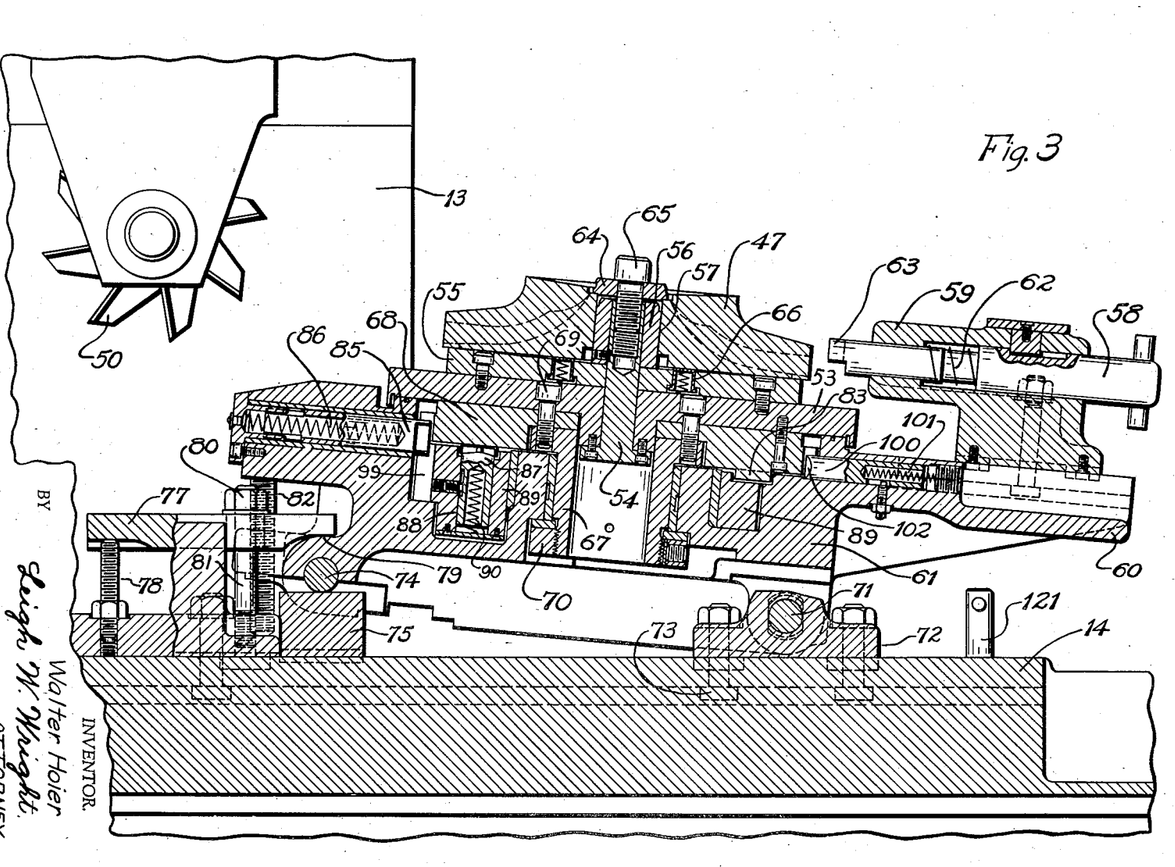
Figure 3 is a vertical section on the line 3—3 of Figure 2.

The table 53 is provided with a vertical stud 54, Figure 3, which projects upwardly through the center of the table and on this stud is mounted a wear-plate 55 and a bushing 56. The bushing is of such size as to accommodate the hole 57 in the work piece without any looseness. Since the table is provided with an indexing mechanism including a locking pawl to be described hereafter, it will be obvious that the table will be in a locked position when the work is changed, and therefore to align the work properly on the table so that one vane is in alignment with the pair of cutters and correlated to the locking means, a work locater is provided adjacent the periphery of the table.

This locating means comprises a plunger 58 reciprocably mounted in a bracket 59 mounted on an extension 60 of the base or support 61 for the table. A spring 62 normally holds this plunger in a retracted position. The end of this plunger has a V-shaped notch 63 formed therein for engaging the end of one of the vanes so as to center it on a radial line which passes between the cutters 49 and 50.

When the work piece has been properly positioned it is frictionally clamped in position by a washer 64 and a bolt 65 threaded in the end of the stud 54. The wear-plate is provided with a plurality of spring pressed plungers 66 whereby when the bolt 65 is loosened the plungers tend to lift the work from the table sufficiently to facilitate its removal.

A sleeve 67 is journaled in the base 61 and is provided on one end with a flange to which an index plate 68 and the table 53 are fastened as by bolts 69. The sleeve is held against lifting by a nut 70 threaded on the lower end.

The base 61 of the indexing fixture is supported for oscillation on a pintle rod 71 which, as shown in Figure 4, passes through a pillow block 72 which is bolted to the table 14 by T bolts 73. The other end of the support is provided with a pin 74 which is adapted to rest on a sine block 75 mounted on the table. The sine block is interchangeable with other blocks to vary the angle of inclination of the support 61 and thereby the angular relation of the work with respect to a horizontal.

The raised end of the base 61 is clamped to the sine block by a pair of clamping bars 76 and 77 which have their outer ends supported on adjustable bolts 78 and their other ends resting on a shelf 79 formed integral with the support 61. These clamping bars are pulled down by nuts 80 threaded on the end of stud bolts 81. The pressure downward is such as to also clamp the sine block to the table. To assist in holding the support 61 in angular position while the sine block is being changed or adjusted, the support 61 has a bolt 82 threaded therein, the lower end of the bolt engaging the top of the table whereby after the sine block is in position the bolt is rotated to lower the fixture onto the sine block.

Figures 6, 7, 8, 9:
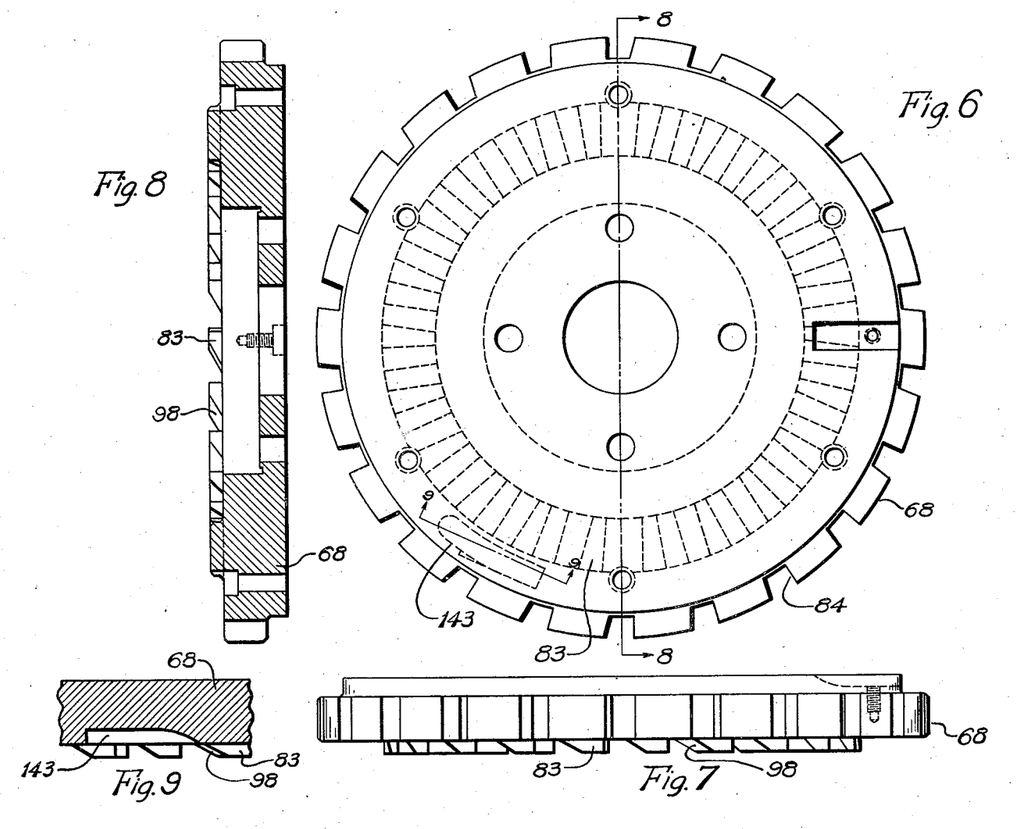
Figure 6 is a detail plan view of the index plate.
Figure 7 is an elevational view of the plate shown in Figure 6.
Figure 8 is a section on the line 8—8 of Figure 6.
Figure 9 is a detail section on the line 9—9 of Figure 6.
Figures 10, 11:
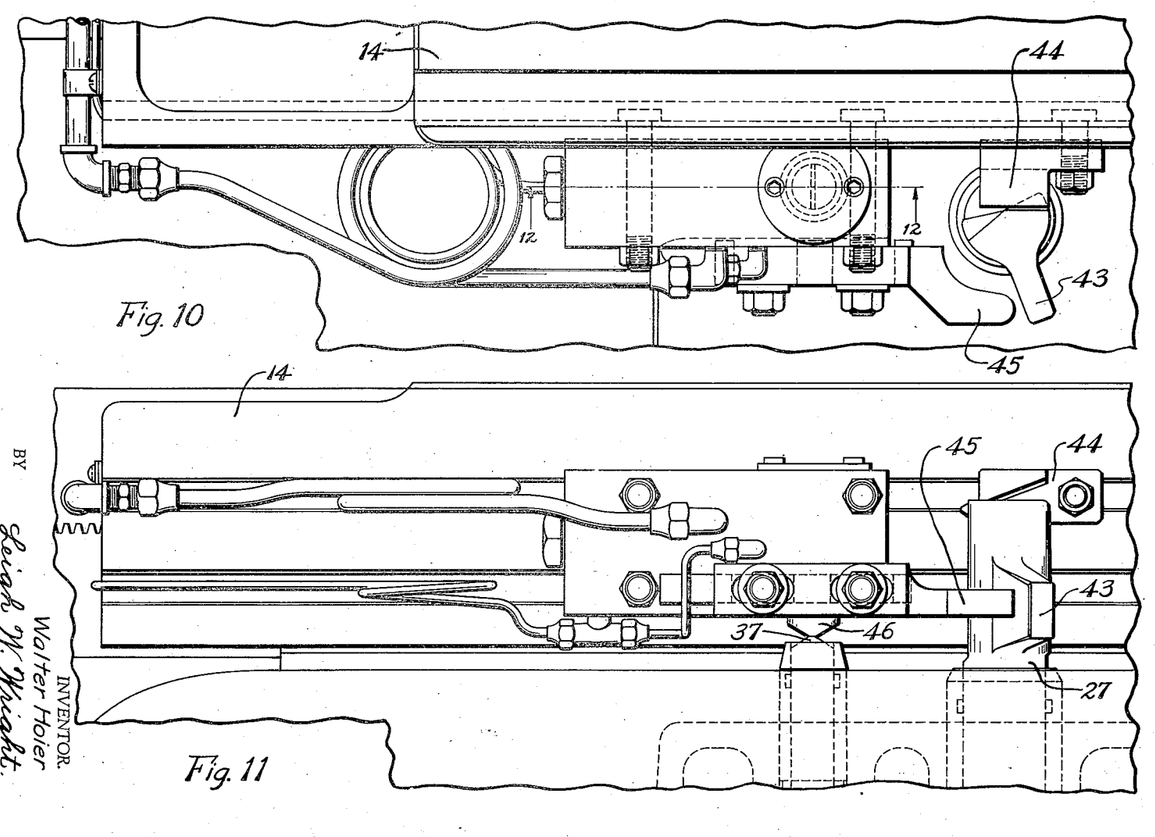
Figure 10 is a plan view of the stopping and reversing dogs.
Figure 11 is a view in elevation of the parts shown in Figure 10.
Figures 15, 16:
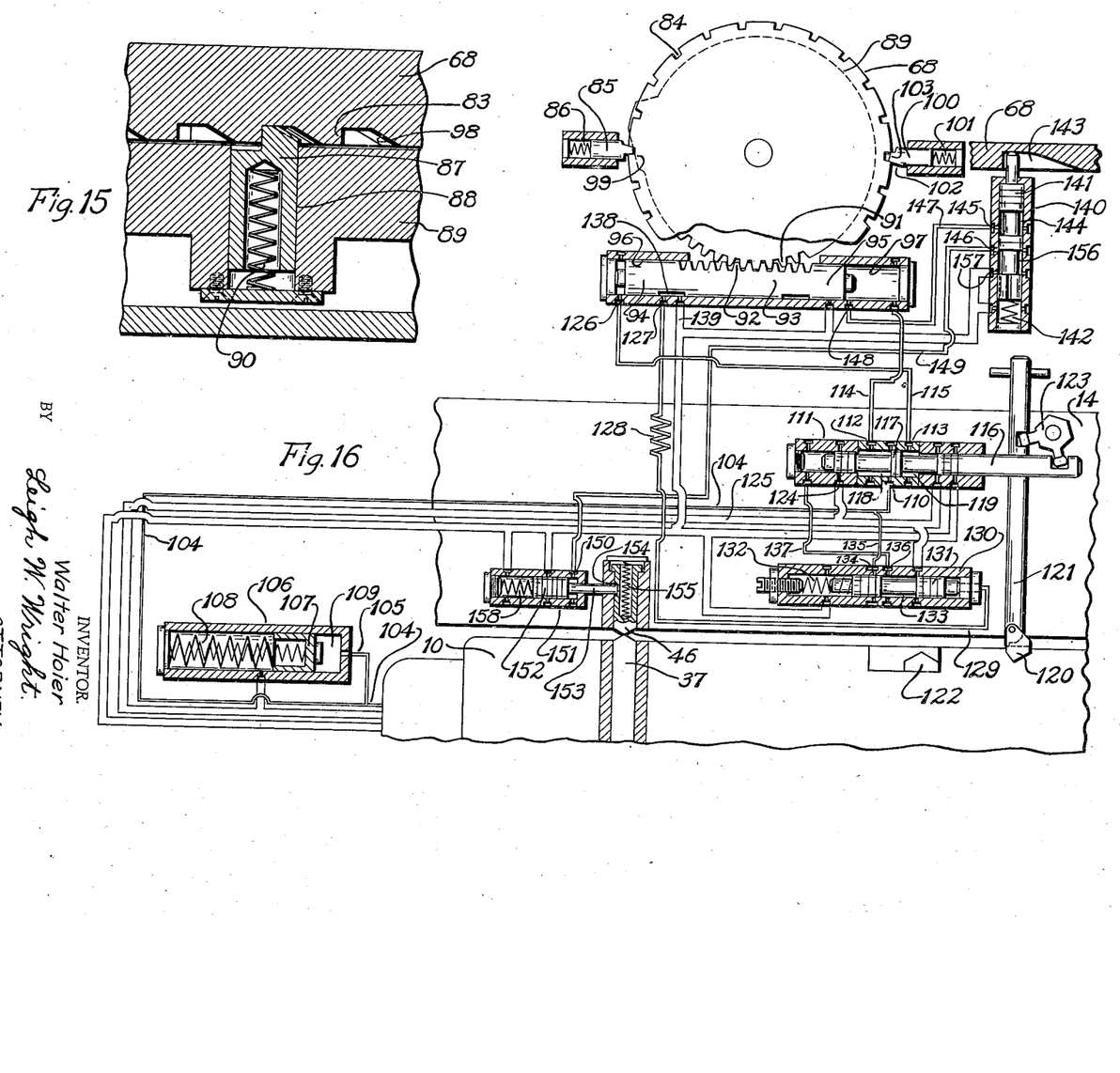
Figure 15 is a detail section in elevation as viewed on the line 15—15 of Figure 5.
Figure 16 is a diagrammatic view of the hydraulic control circuit for the indexing and stopping mechanism.

The index plate 68 is shown in detail in Figures 6, 7 and 8 from which it will be noted that the underside of the plate is provided with a series of ratchet teeth 83 and that the periphery of the plate is provided with a series of locking or locating notches 84 which are adapted to receive a locking plunger 85 which, as shown in Figure 15, is normally urged into engagement with the periphery of the plate by a spring 86. The ratchet 87 for actuating the plate 68 is more particularly shown in Figure 15, from which it will be noted that the plunger 87 is slidably mounted in a bore 88 formed in an oscillatable gear member 89 and continuously urged upward into engagement with the ratchet teeth 83 by a spring 90.

Figure 5:
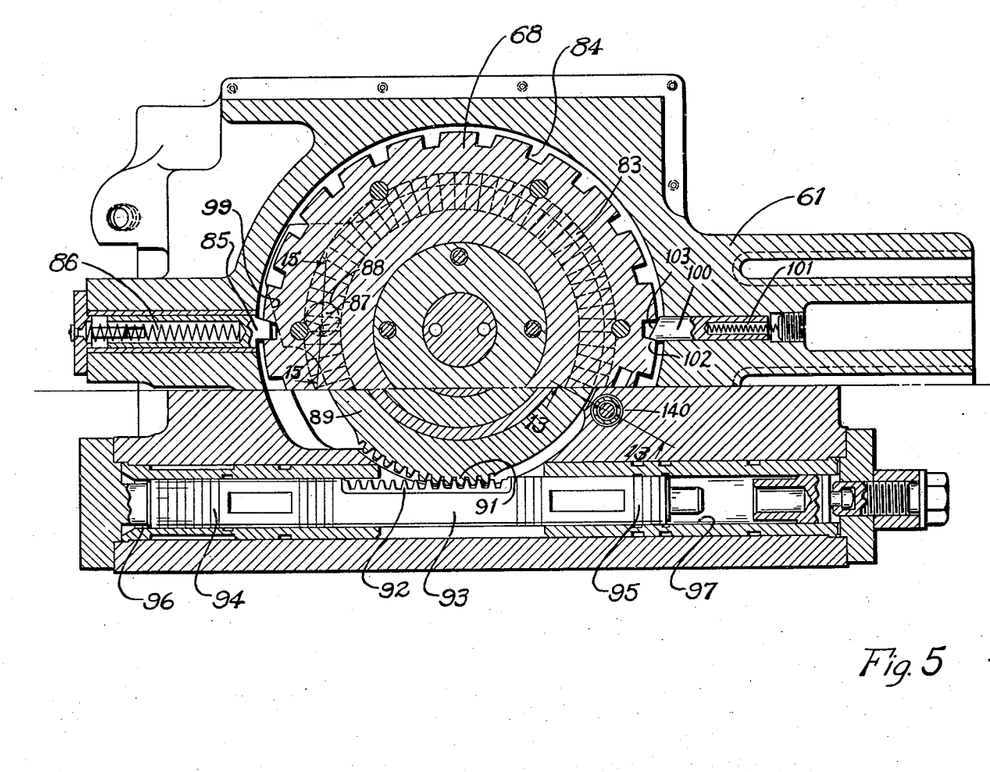
Figure 5 is a sectional plan view as viewed on the line 5—5 of Figure 1.

Referring to Figure 5, the member 89 is provided with a segmental gear 91 which intermeshes with rack teeth 92 formed on a reciprocable plunger 93. The opposite ends of this plunger are in the form of pistons 94 and 95 which are slidable in cylinders 96 and 97 respectively. Fluid pressure is adapted to be alternately connected to the cylinders to effect reciprocation of the member 93 and thereby oscillation of gear member 89.

In operation, as the piston 93 moves toward the right, the ratchet 87 is depressed by the angular wall 98 of the ratchet teeth as more particularly shown in Figure 15, and at the same time an angular cam surface 99 formed on the member 89, as shown in Figures 3 and 5, is adapted to engage the end of the locking pawl 85 and effect retraction thereof. To insure against rotation of the index plate 68, when the locking pawl 85 is withdrawn, a hold-back plunger 100 is reciprocably mounted in the support 61 and continuously urged by a spring 101 into engagement with the periphery of the plate. The end of this plunger has an angular surface 102 which is adapted to engage the side wall of the notch 84 in such a manner as to prevent counterclockwise rotation of the index plate. Upon movement in the other direction the ratchet picks up the plate and rotates it in a clockwise direction, as viewed in Figure 5, and by virtue of the other angular face 103 formed on the plunger 100 it is cammed outward and thus does not interfere with the advance of the plate.

At the same time the cam 99 moves out of engagement with the end of the locking plunger 85 whereby it is free to snap into engagement with the next locking slot that comes into position. It should be noted that all of this indexing mechanism is self-contained in the base 61 which eliminates any complicated driving connections when the support is angularly adjusted.

Fluid pressure for operating the piston 93 of the ratchet mechanism is taken from the delivery of the rapid traverse pump 22 shown in Figure 14 through channel 104. This channel is led out through one end of the machine as shown in Figure 1, and has a branch connection 105, Figure 16, to an accumulator cylinder 106, which has a piston 107 backed up by suitable springs 108 whereby a volume of liquid under pressure may be stored in chamber 109 to insure against drop in pressure during operation of the device. The channel 104 continues in the form of a flexible hose, as shown in Figure 1, to the table 14 where it is connected to a port 110 of a reversing valve 111 for the plunger 93. This valve is mounted on the back of the table 14 as more particularly shown in Figure 4. This valve has a pair of ports 112 and 113 which are connected by channels 114 and 115 to the ends of cylinders 97 and 96 respectively.

The valve plunger 116 has an enlarged central spool 117 flanked by cannelures 118 and 119 whereby when the valve is in the position shown, fluid pressure is delivered to cylinder 97, and when the valve is shifted to the left, fluid pressure is delivered to cylinder 96. As the table advances toward the left, a flipper dog 120 rotatably attached to the end of a shifter rod 121 rides over a dog 122 which is attached to the rear of the bed as shown in Figure 2. When the table returns, the flipper is not free to rotate clockwise from the position in which it is shown in Figure 16 whereby the dog 122 will cause upward movement of the shifter rod 121. This movement will be transmitted through a bell crank connection 123 to the reverse plunger 116 causing movement thereof to the left and thus the admission of fluid pressure from port 110 to channel 115 whereby the plunger 93 will be shifted to the right, the enlarged central spool 117 acting as a hydraulic detent to insure completion of the movement.

At the same time port 112 will be connected to the exhaust port 124, and channel 125, which eventually is connected to the return channel 24 shown in Figure 14.

When the plunger 93 has completed its movement to the right it will interconnect the port 126 with port 127 whereby fluid pressure will flow through choke coil 128 and channel 129 to pilot valve 130 and shift the plunger 131 thereof to the left against the resistance of spring 132.

This will position the cannelure 133 to interconnect a port 134, which is branch connected by line 135 to the pressure line 104, to a port 136 which is connected by channel 137 to the left end of reverse valve 111. The coil 128 provides a slight delay to insure that the flipper 120 has moved out of engagement with dog 122 whereby upon admission of pressure to the left end of valve 111, the plunger 116 may be returned to the right and thereby reconnect pressure port 110 with port 112 and thus return plunger 93. This will effect indexing of the table 53. When the plunger 93 has completed its return movement port 127 will be connected by a groove 138 to exhaust channel 139 whereby the fluid may gradually be forced out of the end of the valve 130 by the spring 132 in returning the plunger 131. This will place the parts in their original position in preparation for the next indexing movement.

It will now be noted that the table will automatically continue its reciprocating movement in a cycle comprising rapid traverse advance, feed, rapid return and automatic reverse, and during the return movement of each cycle the work supporting table will be automatically indexed. These cycles will be repeated until all of the vanes on the work piece have been machined.

Means have been provided for automatically stopping the table after all of the vanes have been machined. The initiating control for this comprises a valve 140 which contains a plunger 141 which is normally urged in one direction by a spring 142. The upper end of this plunger rides on the underside of the index plate until a depression 143 formed in the underside of the index plate as shown in Figures 6, 9 and 16 moves into position over the plunger which occurs once for each revolution of the plate. While the valve plunger 141 is held down by the plate 68 an annular groove 144 formed in the plunger is in a position to interconnect a pair of ports 145 and 146. The port 145 is connected by a channel 147 to a port 148 formed in the cylinder 97 whereby when the indexing plunger 95 completes its return movement the fluid pressure in cylinder 97 may pass through port 148, channel 147, interconnected ports 145 and 146 and channel 149 to port 150 of an interlock cylinder 151. This cylinder contains a fluid actuated piston 152 which has an interlock pin 153 formed in the end thereof which is adapted to engage a notch 154 cut in the periphery of the stop dog 46. The particular arrangement of these parts is more particularly shown in Figure 12.

Figure 12:
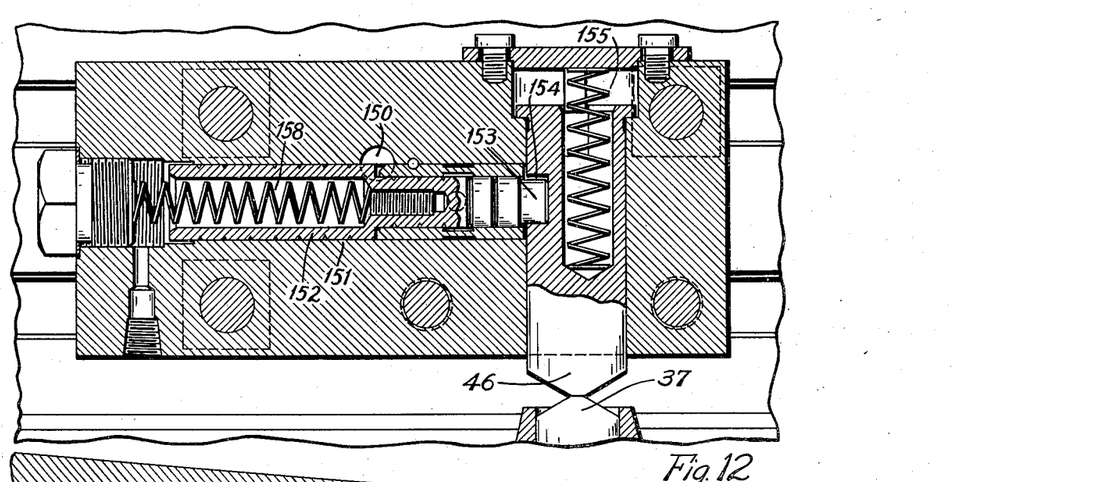
Figure 12 is a detail section on the line 12—12 of Figure 10.

From that figure it will be noted that the stop dog 46 is normally urged downward by a spring 155 but when the lock pin 153 is withdrawn the dog 46 is free to rise upon engagement with stop plunger 37 whereby the plunger 37 will not be trip actuated. When the plunger 141 is permitted to shift by virtue of registration with the depression 143, the port 146 is interconnected by an annular groove 156 to an exhaust port 157 whereby the port 150 of cylinder 151 is connected to reservoir permitting a spring 158 to shift the lock pin 153 into engagement with the stop dog 46, whereby upon the next return movement of the table the plunger 37 will be depressed and the table will be stopped.

Figure 13:
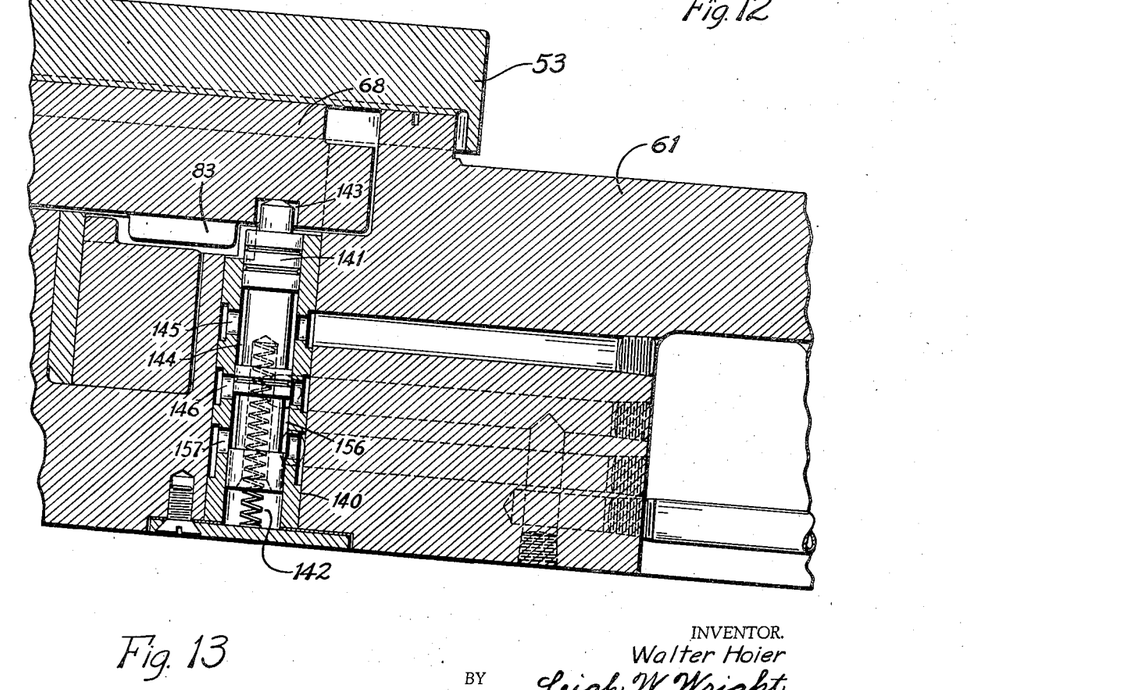
Figure 13 is a detail section in elevation taken on the line 13—13 of Figure 5.

It will be noted from Figure 13 that the plunger 141 is mounted in the index fixture support 61.

There has thus been provided an improved automatic indexing milling machine including an index table which is adapted to be reciprocated in repetitive automatic cycles and during the return movement of each cycle the work supporting table is automatically indexed and after a complete revolution of the work supporting table by successive indexing movements the main table of the machine is automatically stopped.

It will be noted that the indexing fixture is self-contained and hydraulically actuated whereby it may be conveniently and quickly arranged at any desired angle within limitations to position work in different angular relations to the cutting path of the cutter, because hydraulic pipe connections are readily adjustable as compared to a mechanical drive which would require a multiplicity of parts to provide a similar flexible power transmission train.

What is claimed is:

1. In a milling machine having a bed, a table reciprocably mounted on the bed, a tool supported by the bed in operative relation to the table, the combination of power operable transmission means for reciprocating the table, an indexible work fixture mounted on the table, fluid operable means self-contained in the fixture for effecting indexing thereof, a reversing valve for said fluid operable means, means actuated by said transmission for supplying fluid pressure to said valve, a trip operable member carried by the table for shifting said reversing valve in one direction, and fluid operable connections effected by said fluid operable means for shifting the reversing valve in the other direction and simultaneously repositioning said trip operable member.

2. In a machine tool having a tool and a reciprocating support movable relative thereto, the combination of an indexible work fixture mounted on the support, a fluid operable piston contained in the fixture for effecting said indexing, a source of pressure, a reversing valve mounted on the table and shiftable to connect said pressure for opposite actuation of said piston, a trip plunger carried by the table and operatively connected to said valve, a fixed dog for cooperating with said plunger, dog engaging means on the plunger effective during only one direction of table movement to shift the plunger and thereby the reversing valve, and means connectible by the piston upon completion of its movement in one direction to connect its actuating pressure to effect return shifting of the reverse valve and simultaneously repositioning said plunger.

3. In a machine tool having a cutting tool and a work support mounted for relative movement, the combination of an indexible fixture mounted on the work support, fluid operable means to effect said indexing including a piston, a source of pressure, a reversing valve for connecting said source of pressure to said piston to effect reversible operation of said piston, trip operable means carried by the support for shifting said reversing valve in one direction, a pilot valve for connecting pressure to shift the reversing valve in the other direction, and channel means connecting said pilot valve to the piston for receiving fluid pressure therefrom upon completion of its stroke in one direction.

4. In a machine tool having a cutting tool and a work support mounted for relative movement, the combination of an indexible fixture mounted on the work support, fluid operable means to effect said indexing including a piston, a source of pressure, a reversing valve for connecting said source of pressure to said piston to effect reversible operation of said piston, trip operable means carried by the support for shifting said reversing valve in one direction, a pilot valve for connecting pressure to shift the reversing valve in the other direction, means connecting said pilot valve to the piston for receiving fluid pressure therefrom upon completion of its stroke in one direction, and a choke coil in said connecting means for retarding actuation of said pilot valve.

5. In a machine tool having a tool support and a work support supported for relative movement, the combination of an indexing fixture mounted on the work support, means to reciprocate the work support on a cutting stroke and a return stroke, fluid operable means for indexing said fixture including a fluid operable piston, a reversing valve therefor, a trip plunger carried by the table and operatively connected to said valve, a fixed dog, means on the plunger for engaging said dog, said means being inoperative during the cutting stroke but effective during the return stroke to effect actuation of said reversing valve, a pilot valve, means normally holding said valve in an inoperative position, and means responsive to completion of movement of said piston in one direction for connecting fluid pressure for actuation of said pilot valve and thereby connection of pressure to said reversing valve to effect return shifting thereof.

6. In a machine tool having a tool support and a work support supported for relative movement, the combination of an indexing fixture mounted on the work support, means to reciprocate the work support on a cutting stroke and a return stroke, fluid operable means for indexing said fixture including a fluid operable piston, a reversing valve therefor, a trip plunger carried by the table and operatively connected to said valve, a fixed dog, means on the plunger for engaging said dog, said means being inoperative during the cutting stroke but effective during the return stroke to effect actuation of said reversing valve, a pilot valve, means normally holding said valve in an operative position, means responsive to completion of movement of said piston in one direction for connecting fluid pressure for actuation of said pilot valve and thereby connection of pressure to said reversing valve to effect return shifting thereof, and connections rendered effective upon return movement of said piston for relieving the pressure on said pilot valve whereby it will return to an inoperative position.

7. In a machine tool having a tool support and a cutter support, the combination of power operable means for reciprocating said support including automatic reversing means, a stop plunger, a trip dog carried by the table for engaging said plunger, a shiftable member carried by the table for locking said dog in a trip effecting position, fluid pressure means for holding said member in an unlocked position whereby said table may effect a continuous series of reciprocations, and means carried by the table for releasing said fluid pressure after a predetermined number of continuous reciprocations of the work support.

8. In a milling machine having a cutting tool, a reciprocable work support and an indexing fixture carried by the support for successive movements toward and from the cutting means whereby a series of radial milling operations may be performed upon a work piece, the combination of trip operable means for stopping the table after the necessary number of radial milling operations have been performed including a stop dog, a locking member for rendering said dog effective, fluid operable means for holding said member in an inoperative position during the reciprocations of the table including a control valve for connecting pressure to said fluid operable means, an index plate carried by the indexible fixture, means holding said valve in engagement with said plate and said plate having a notch formed therein for permitting release of said valve after a complete revolution of the indexing fixture.

WALTER HOIER.

REFERENCES CITED

The following references are of record in the file of this patent:

UNITED STATES PATENTS

| Number | Name | Date |
|---|---|---|
| 1,936,257 | Nenninger et al. | Nov. 21, 1933 |
| 1,949,079 | Armitage | Feb. 27, 1934 |
| 2,205,361 | Kearney et al. | June 18, 1940 |
| 2,309,241 | Curtis | Jan. 26, 1943 |
| 2,007,827 | Fletcher | July 9, 1935 |
| 2,261,052 | Coffin et al. | Oct. 28, 1941 |
| 1,656,624 | Finsen | Jan. 17, 1928 |
| 1,971,598 | Condon | Aug. 28, 1934 |
| 2,206,492 | Westenberger et al. | July 2, 1940 |
| 2,262,103 | Laesster | Nov. 11, 1941 |